(12) United States Patent  
Karapantelakis et al.

(10) Patent No.: US 11,190,814 B2  
(45) Date of Patent: Nov. 30, 2021

(54) ADAPTING LIVE CONTENT

(71) Applicant: Telefonaktiebolaget LM Ericsson (publ), Stockholm (SE)

(72) Inventors: Athanasios Karapantelakis, Solna (SE); Rafia Inam, Västerås (SE); Konstantinos Vandikas, Solna (SE); Keven Wang, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/626,901

(22) PCT Filed: Jun. 29, 2017

(86) PCT No.: PCT/SE2017/050720  
§ 371 (c)(1),  
(2) Date: Dec. 27, 2019

(87) PCT Pub. No.: WO2019/004884  
PCT Pub. Date: Jan. 3, 2019

(65) Prior Publication Data  
US 2020/0245004 A1    Jul. 30, 2020

(51) Int. Cl.  
*G06F 15/16* (2006.01)  
*H04N 21/238* (2011.01)  
(Continued)

(52) U.S. Cl.  
CPC ....... *H04N 21/238* (2013.01); *H04N 21/2187* (2013.01); *H04N 21/23439* (2013.01);  
(Continued)

(58) Field of Classification Search  
CPC ............. H04N 21/238; H04N 21/2187; H04N 21/23439; H04N 21/2408;  
(Continued)

(56) References Cited

U.S. PATENT DOCUMENTS 8,166,032 B2    4/2012 Sommer et al.  
9,213,986 B1 *  12/2015 Buchheit .......... H04N 21/25891  
(Continued)

OTHER PUBLICATIONS

International Search Report and Written Opinion of the International Searching Authority, PCT/SE2017/050720, dated Aug. 16, 2017, 10 pages.

(Continued)

*Primary Examiner* — Karen C Tang  
(74) *Attorney, Agent, or Firm* — Sage Patent Group

(57) ABSTRACT

A method for adapting a piece of live content includes determining a reference group including at least one reference content consumer device being associated with a reference user and including a user state device for detecting a user state; determining that the piece of live content is streamed to the content consumer devices of the reference group; obtaining, from at least one of the content consumer devices of the reference group, at least one respective emotion indicator; determining an emotion; determining a target group comprising at least one target content consumer device being associated with a target user; triggering adapting of the piece of live content based on the at least one emotion indicator and a preference; and triggering the adapted content to be delayed.

19 Claims, 5 Drawing Sheets

(51) Int. Cl.
  *H04N 21/2187* (2011.01)
  *H04N 21/2343* (2011.01)
  *H04N 21/24* (2011.01)
  *H04N 21/442* (2011.01)
  *H04N 21/454* (2011.01)
  *G06F 15/173* (2006.01)

(52) U.S. Cl.
  CPC ... *H04N 21/2408* (2013.01); *H04N 21/44218* (2013.01); *H04N 21/4542* (2013.01)

(58) Field of Classification Search
  CPC ......... H04N 21/44218; H04N 21/4542; H04N 21/252; H04N 21/237; H04N 21/25883; H04N 21/25891; H04N 21/4756; H04N 21/6543
  USPC ................................................ 709/224, 231
  See application file for complete search history.

(56) References Cited

U.S. PATENT DOCUMENTS

| | | | |
|---|---|---|---|
| 9,336,268 B1 | 5/2016 | Moudy et al. | |
| 2002/0152117 A1* | 10/2002 | Cristofalo | G06Q 30/0269 705/14.52 |
| 2011/0142413 A1 | 6/2011 | Kang et al. | |
| 2011/0283311 A1* | 11/2011 | Luong | H04N 21/43615 725/28 |
| 2013/0117352 A1* | 5/2013 | Chen | H04N 21/4383 709/203 |
| 2014/0068661 A1* | 3/2014 | Gates, III | H04N 21/441 725/34 |
| 2014/0071342 A1* | 3/2014 | Winograd | H04N 21/4532 348/383 |
| 2014/0075465 A1 | 3/2014 | Petrovic et al. | |
| 2014/0366049 A1 | 12/2014 | Lehtiniemi et al. | |
| 2015/0070585 A1* | 3/2015 | Sharif-Ahmadi | H04L 65/607 348/564 |
| 2015/0181291 A1* | 6/2015 | Wheatley | H04N 21/84 725/10 |
| 2016/0066036 A1 | 3/2016 | Felt et al. | |
| 2016/0227280 A1 | 8/2016 | Candelore | |

OTHER PUBLICATIONS

Sinha, Utsav et al. "Detecting Emotional Scene of Videos from Subtitles," CS 365: Artificial Intelligence, Indian Institute of Technology Kanpur, Apr. 17, 2015, 12 pages.

Kiritchenko, Svetlana et al. "Sentiment Analysis of Short Informal Texts," Journal of Artificial Intelligence Research, 50, 2014, pp. 723-762.

Nomiya, Hiroki et al. "Unsupervised Emotional Scene Detection for Lifelog Video Retrieval Based on Gaussian Mixture Model," Procedia Computer Science, 22, 2013, pp. 375-384.

Kwon, Jangho et al. "A Wearable Device for Emotional Recognition Using Facial Expression and Physiological Response," IEEE, 2016, pp. 5765-5768.

Peter Washington, Catalin Voss, Nick Haber, Serena Tanaka, Jena Daniels, Carl Feinstein, Terry Winograd, and Dennis Wall. 2016. "A Wearable Social Interaction Aid for Children with Autism." In Proceedings of the 2016 CHI Conference Extended Abstracts on Human Factors in Computing Systems (CHI EA '16). Association for Computing Machinery, New York, NY, USA, pp. 2348-2354. DOI:https://doi.org/10.1145/2851581.2892282.

\* cited by examiner

ADAPTING LIVE CONTENT

CROSS REFERENCE TO RELATED APPLICATIONS

This application is a 35 U.S.C. § 371 national stage application of PCT International Application No. PCT/SE2017/050720 filed on Jun. 29, 2017, the disclosure and content of which is incorporated by reference herein in its entirety.

TECHNICAL FIELD

The invention relates to a method, content determiners, a computer program and a computer program product for adapting a piece of live content based emotions determined for a reference group.

BACKGROUND

Streaming video and/or audio content is continuously increasing in popularity. At the same time, user preferences are often strong with regard to the type of content is to be consumed. For instance, many users do not want content causing fear or content with nudity. Traditionally, media consumers have relied on official ratings (e.g. by Motion Picture Association of America, MPAA). More recently, there are web sites describing content in more detail with regard to potentially offensive sections.

There is also research occurring to determine the type of content based on the content itself or based on emotional response of content consumers.

US 2015/0181291 A1 discloses methods and systems for providing ancillary content in media assets. Specifically, a media guidance application may alert a user to remove, or modify, portions of a media asset based on an emotional response profile associated with the media asset. The emotional response profile may indicate representative emotional responses of other users associated with one or more progression points of the media asset. Upon determining that a user currently consuming the media asset is approaching a portion of the media asset associated with undesirable emotional responses, the media guidance application may alert the user to remove, or modify, the undesirable portion.

However, the presented emotional response solution is not readily used for live content.

SUMMARY

An object of embodiments presented herein is to improve how emotions from reference users are utilised to adapt content for target users for live content.

According to a first aspect, it is provided a method for adapting a piece of live content. The live content comprises at least one of video content and audio content. The method is performed in a content determiner and comprises the steps of: determining a reference group comprising at least one reference content consumer device, each reference content consumer device being associated with a reference user and comprising a user state device for detecting a user state for determining an emotion of the reference user; determining that the piece of live content is streamed to the content consumer devices of the reference group; obtaining, from at least one of the content consumer devices of the reference group, at least one respective emotion indicator associated with a time section of the piece of live content; determining an emotion of at least part of the reference users and associating the determined emotion with the time section of the piece of live content; determining a target group comprising at least one target content consumer device, each target content consumer device being associated with a target user; triggering adapting of the piece of live content for at least one of the target content consumer devices, resulting in a piece of adapted content, based on the at least one emotion indicator and a preference associated with each respective target content consumer device; and triggering the adapted content to be delayed to achieve at least a minimum latency in relation to the streaming of the piece of live content to the content consumer devices of the reference group.

The method may further comprise the step of: streaming the adapted content to the target content consumer devices.

The step of triggering adapting may comprise sending a first signal to at least one of the target content consumer devices to adapt the content. In such a case, the step of triggering the adapted content to be delayed comprises sending a second signal to at least one of the target content consumer devices to delay the adapted content.

The step of determining a reference group may be based on a predefined setting indicating approval to become a reference user.

The step of determining a target group may be based on an age indicator of users.

The step of determining a target group may be based on a parental control preference of the target users which is dependent on time of day.

The step of determining an emotion may comprise receiving user input data from the reference users in response to a user interface query, to the reference users, asking about an emotional state of the respective reference users.

The step of triggering adapting may comprise modifying video content of the piece of content.

The step of triggering adapting may comprise modifying audio content of the piece of content.

The step of triggering adapting may comprise modifying text content of the piece of content.

The step of determining that the piece of live content is streamed may comprise streaming the piece of live content to the content consumer devices of the reference group.

According to a second aspect, it is provided a content determiner for adapting a piece of live content. The live content comprises at least one of video content and audio content. The content determiner comprises: a processor; and a memory storing instructions that, when executed by the processor, cause the content determiner to: determine a reference group comprising at least one reference content consumer device, each reference content consumer device being associated with a reference user and comprising a user state device for detecting a user state for determining an emotion of the reference user; determine that the piece of live content is streamed to the content consumer devices of the reference group; obtain, from at least one of the content consumer devices of the reference group, at least one respective emotion indicator associated with a time section of the piece of live content; determine an emotion of at least part of the reference users and associating the determined emotion with the time section of the piece of live content; determine a target group comprising at least one target content consumer device, each target content consumer device being associated with a target user; trigger adapting of the piece of live content for at least one of the target content consumer devices, resulting in a piece of adapted content, based on the at least one emotion indicator and a preference associated with each respective target content consumer device; and trigger the adapted content to be delayed to achieve at least a minimum latency in relation to the streaming of the piece of live content to the content consumer devices of the reference group.

The content determiner may further comprise instructions that, when executed by the processor, cause the content determiner to stream the adapted content to the target content consumer devices.

The instructions to trigger adapting may comprise instructions that, when executed by the processor, cause the content determiner to send a first signal to at least one of the target content consumer devices to adapt the content. In such a case, the instructions to trigger the adapted content to be delayed comprise instructions that, when executed by the processor, cause the content determiner to send a second signal to at least one of the target content consumer devices to delay the adapted content.

The instructions to determine a reference group may comprise instructions that, when executed by the processor, cause the content determiner determine the reference group based on a predefined setting indicating approval to become a reference user.

The instructions to determine a target group may comprise instructions that, when executed by the processor, cause the content determiner to determine the target group is based on an age indicator of users.

The instructions to determine a target group may comprise instructions that, when executed by the processor, cause the content determiner to determine the target group based on a parental control preference of the target users which is dependent on time of day.

The instructions to determine an emotion may comprise instructions that, when executed by the processor, cause the content determiner to receive user input data from the reference users in response to a user interface query, to the reference users, asking about an emotional state of the respective reference users.

The instructions to trigger adapting may comprise instructions that, when executed by the processor, cause the content determiner to modify video content of the piece of content.

The instructions to trigger adapting may comprise instructions that, when executed by the processor, cause the content determiner to modify audio content of the piece of content.

The instructions to trigger adapting may comprise instructions that, when executed by the processor, cause the content determiner to modify text content of the piece of content.

The instructions to determine that the piece of live content is streamed comprise instructions that, when executed by the processor, cause the content determiner to stream the piece of live content to the content consumer devices of the reference group.

According to a third aspect, it is provided a content determiner comprising: means for determining a reference group comprising at least one reference content consumer device, each reference content consumer device being associated with a reference user and comprising a user state device for detecting a user state for determining an emotion of the reference user; means for determining that a piece of live content is streamed to the content consumer devices of the reference group, the piece of live content comprising at least one of video content and audio content; means for obtaining, from at least one of the content consumer devices of the reference group, at least one respective emotion indicator associated with a time section of the piece of live content; means for determining an emotion of at least part of the reference users and associating the determined emotion with the time section of the piece of live content; means for determining a target group comprising at least one target content consumer device, each target content consumer device being associated with a target user; means for triggering adapting of the piece of live content for at least one of the target content consumer devices, resulting in a piece of adapted content, based on the at least one emotion indicator and a preference associated with each respective target content consumer device; and means for triggering the adapted content to be delayed to achieve at least a minimum latency in relation to the streaming of the piece of live content to the content consumer devices of the reference group.

According to a fourth aspect, it is provided a computer program for adapting a piece of live content, the live content comprising at least one of video content and audio content. The computer program comprises computer program code which, when run on a content determiner causes the content determiner to: determine a reference group comprising at least one reference content consumer device, each reference content consumer device being associated with a reference user and comprising a user state device for detecting a user state for determining an emotion of the reference user; determine that the piece of live content is streamed to the content consumer devices of the reference group; obtain, from at least one of the content consumer devices of the reference group, at least one respective emotion indicator associated with a time section of the piece of live content; determine an emotion of at least part of the reference users and associating the determined emotion with the time section of the piece of live content; determine a target group comprising at least one target content consumer device, each target content consumer device being associated with a target user; trigger adapting of the piece of live content for at least one of the target content consumer devices, resulting in a piece of adapted content, based on the at least one emotion indicator and a preference associated with each respective target content consumer device; and trigger the adapted content to be delayed to achieve at least a minimum latency in relation to the streaming of the piece of live content to the content consumer devices of the reference group.

According to a fifth aspect, it is provided a computer program product comprising a computer program according to the fourth aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1A:
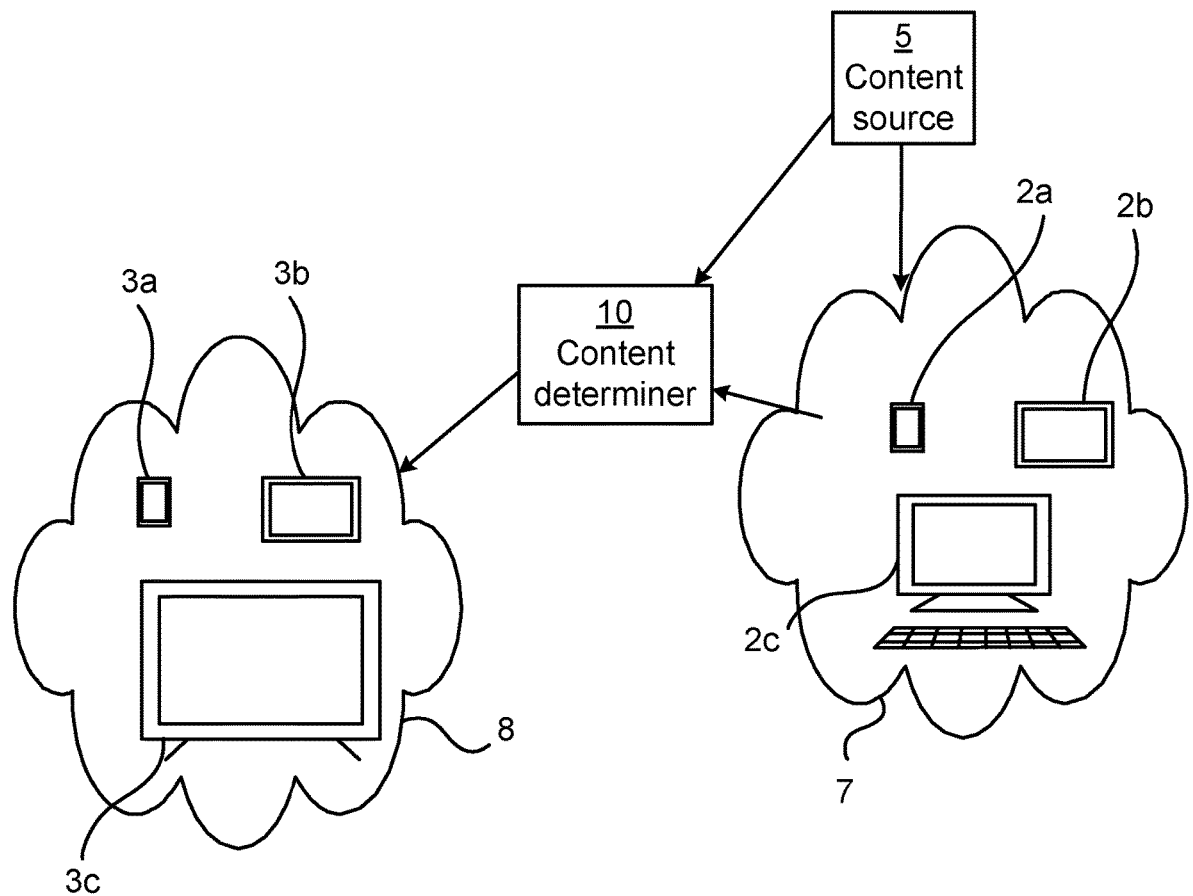
FIGS. 1A-B are schematic diagrams illustrating environments in which embodiments presented herein can be applied.
Figure 1B:
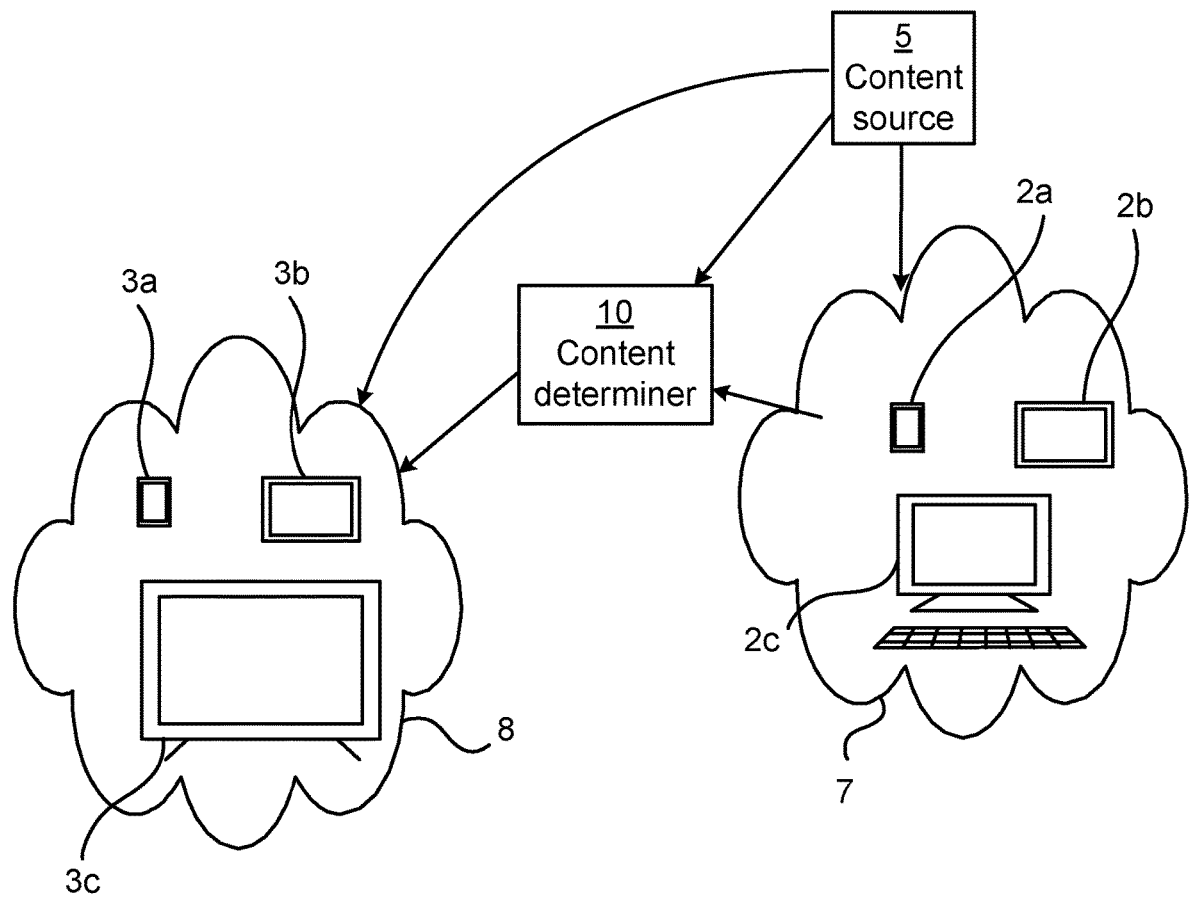

FIGS. 1A-B are schematic diagrams illustrating environments in which embodiments presented herein can be applied. Looking first to FIG. 1A, there is a content source 5 which is capable of providing live content. The live content can be only video, only audio, or a combination of both audio and video. Optionally, the content can comprise other content types, such as text or graphics. The source of the live content can e.g. be a sport event, a music festival, an award show, live theatre, a concert, and/or end user produced live content. Live content is to be interpreted as the content is not pre-recorded. It is to be noted, however, that parts or all of the content can be stored on its progress from the original content source to the end content consumer device, e.g. due to buffering or filtering.

The live content is provided to a reference group 7, comprising at least one reference content consumer device 2a-c. Each reference content consumer device is associated with a reference user. Moreover, each reference content consumer device 2a-c comprises a user state device for detecting a user state for determining an emotion of the reference user. The user state device can be integral with the reference content consumer device or provided as a separate component connected wirelessly or using a cable. The user state device can detect an emotion directly, e.g. using image processing of a face image, or it can detect indirect emotion parameters which can be used for determining an emotion. For instance, the user state device can be any one or more of sensors or wearable devices measuring heart rate/pulse, perspiration, body movement, eye roll, devices measuring group reactions, for example spatial microphones in movie theatres. The user state devices provide emotion indicators to a content determiner 10.

Each reference user can have more than one user state device. For instance, a first user state device can be a fitness tracker measuring heart rate. A second user state device can be a mobile phone with an accelerometer in the pocket of the user, the accelerometer thereby measuring movement. A third user state device can be smart glasses (such as Google Glasses), measuring eye pupil dilation. In such a situation, either the reference content consumption device determines a single emotion indicator based on the three user state devices, or the reference content consumer device sends three separate emotion indicators to the content determiner for the content determiner to determine a single emotion matching the three emotion indicators.

The content determiner determines an emotion for each reference user based on the received emotion indicators. Each emotion indicator is associated with a time section of the piece of live content. Alternatively, an emotion indicator can implicitly be associated with a time section of the piece of live content based on a current position in the live content. Hence, the emotion is then associated with a time section of the piece of live content.

In the example shown in FIG. 1A, there are three reference content consumer devices: a first content consumer device 2a in the form of a mobile phone, a second content consumer device 2b in the form of a tablet computer and a third content consumer device 2c in the form of a desktop computer. It is to be noted that the reference content consumer devices 2a-c can be of any type suitable for receiving live content from the content source 5. Moreover, the reference group 7 can comprise any suitable number of reference content consumer devices.

There is also a second group of content consumer devices in a target group 8 comprising at least one target content consumer device. Each target content consumer device is associated with a target user.

In the example shown in FIG. 1A, there are three target content consumer devices: a first content consumer device 2a in the form of a mobile phone, a second content consumer device 2b in the form of a tablet computer and a third content consumer device 2c in the form of a desktop computer. It is to be noted that the reference content consumer devices 2a-c can be of any type suitable for receiving live content from the content source 5.

According to embodiment presented herein, the content determiner triggers adapting of the piece of live content for at one of the target content consumer devices, resulting in a piece of adapted content, based on the at least one emotion indicator and a preference associated with each respective target content consumer device. In one example, there is a section of the live content which triggers an emotion of fear in the reference user(s). One or more target user has specified in a preference that fear inducing content should be avoided. The content determiner then ensures the live content is adapted to prevent the fear inducing content from being shown for such target users. The content can be adapted e.g. by temporarily replacing the live content with recorded content or a blank screen with informative text can be displayed. Alternatively, certain sections can be pixelated.

Moreover, the adapted content is delayed to achieve at least a minimum latency in relation to the streaming of the piece of live content to the content consumer devices of the reference group. In this way, the content determiner is able to collect emotion indicators from the reference group and can determine how these responses will influence the target group.

It is to be noted that while the reference group 7 and the target group 8 are here shown on either side of the content determiner, the grouping is only logical and not location based. Hence the reference content consumer devices 2a-c can be located anywhere with network access and the target content consumer devices 3a-c can be located anywhere with network access.

In the embodiment of FIG. 1A, the content determiner 10 performs the adapting of content for the target content consumer devices 3a-c.

Looking now to FIG. 1B, the only difference to the embodiment of FIG. 1A is that the live content is provided directly from the content source 5 to the target content consumer devices 3a-c. In this embodiment, the content determiner 10 communicates with the target content consumer devices 3a-c to allow the target content consumer devices 3a-c to perform the adapting of content in accordance with target user preferences and the emotion determined for the live content.

In FIG. 1A-B, signalling and content distribution can occur using any suitable digital communication standard, including any one or more of Ethernet, any of the IEEE 802.11x standards, cellular networks, etc.

Figure 2:
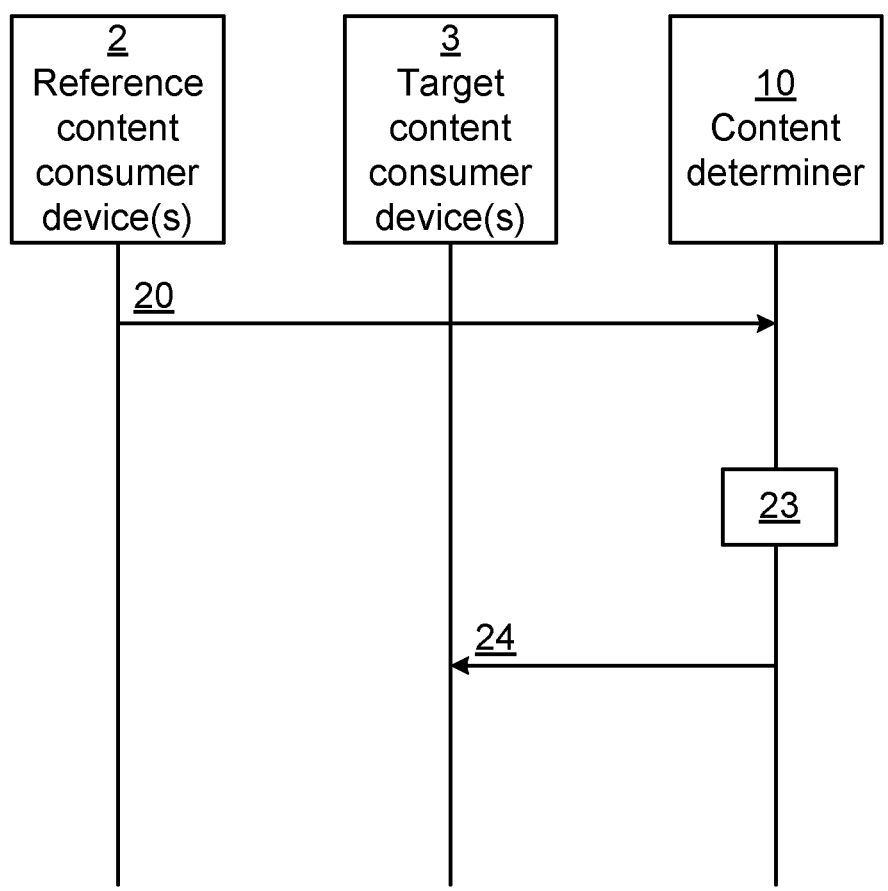
FIG. 2 is a sequence diagrams illustrating communication between various entities of embodiments which can be applied in the environment of FIG. 1.

FIG. 2 is a sequence diagrams illustrating communication between various entities of embodiments which can be applied in the environment of FIG. 1.

One or more reference content consumer devices 2 send an emotion indicator 20 to the content determiner. The content determiner 10 determines 23, based on target user preferences and the emotion indicator(s) 20, that the live content should be adapted. The content determiner then triggers 24 adapting of the content, either by the content determiner 10 adapting the live content itself or by sending a signal to the target content consumer device(s) for the target content consumer device(s) to adapt the live content.

Figure 3:
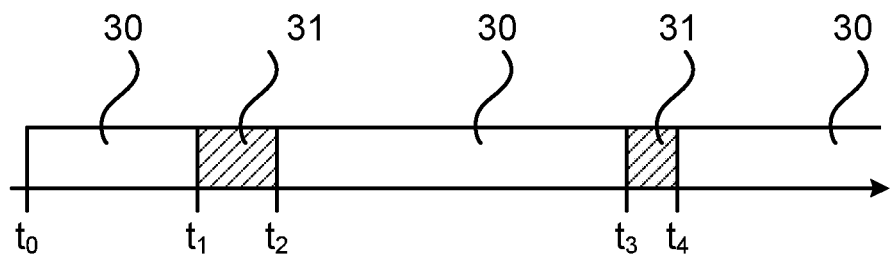
FIG. 3 is a schematic diagram illustrating how content can be adapted according to embodiments presented herein.

FIG. 3 is a schematic diagram illustrating how content can be adapted according to embodiments presented herein, from a perspective of a target content consumer device.

Between t0 and t1, unadapted (original) live content 30 is presented. At time $t_1$, content adapting is triggered and adapted content 31 is presented until time $t_2$, after which unadapted live content 30 is again presented. A second section of content adapting occurs between times $t_3$ and $t_4$. It is to be noted that each occurrence of content adaption can, but does not need to, adapt the content in a different way.

Figure 4A:
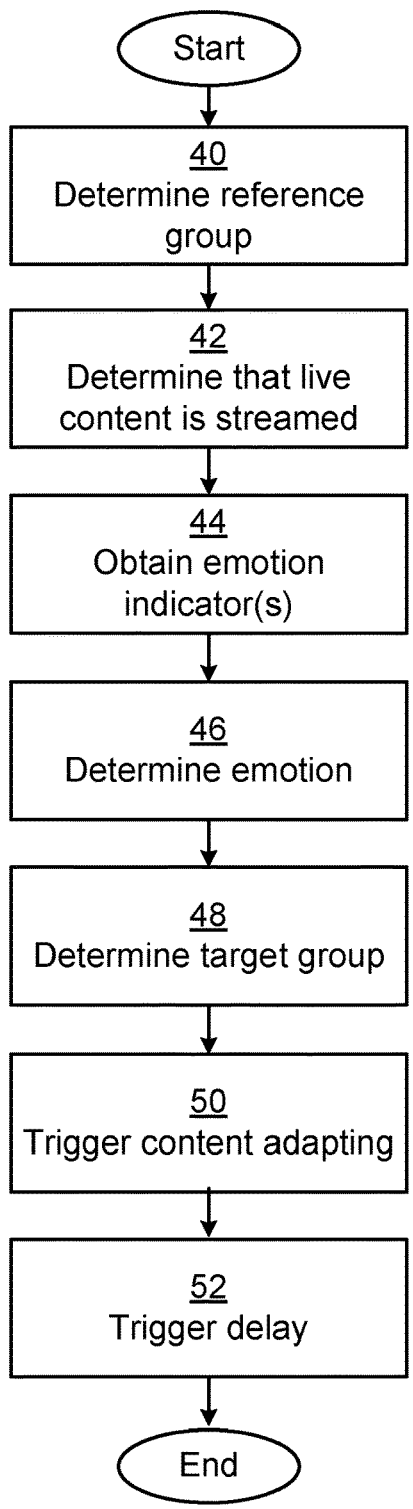
FIGS. 4A-B are flow charts illustrating embodiments of methods for adapting a piece of live content, the method being performed in a content determiner.
Figure 4B:
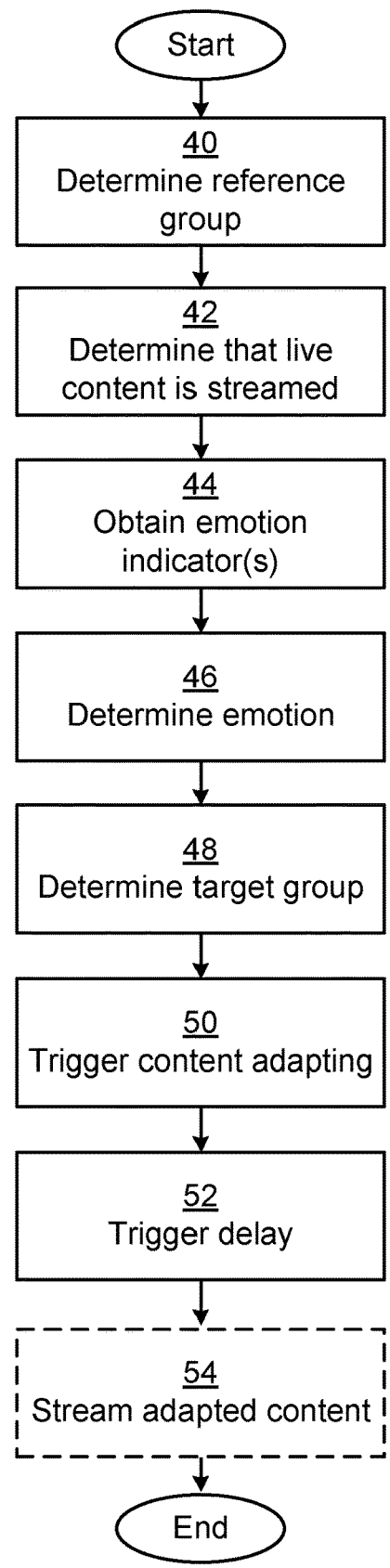

FIGS. 4A-B are flow charts illustrating embodiments of methods for adapting a piece of live content, the method being performed in a content determiner. The live content comprises at least one of video content and audio content. It is to be noted that the method is performed for one specific piece of live content. In parallel, the content determiner can perform several such methods, each for a specific piece of live content.

In a determine reference group step 40, the content determiner determines a reference group comprising at least one reference content consumer device. Each reference content consumer device is associated with a reference user and comprises a user state device for detecting a user state for determining an emotion of the reference user.

The reference group can be determined dynamically based on what user, consuming the piece of live content, has a predefined setting indicating approval to become a reference user. The reference group could also be determined based on feedback from the target users who evaluate the quality of their content consumption experience. Optionally, there is a random element affecting which, of a plurality of eligible reference users, should be reference users for the specific piece of live content.

The reference content consumer devices are notified of their role to provide emotion indicator(s) to the content determiner. This can e.g. form part of a custom attribute of a SIP (Session Initiation Protocol) invite message. For instance a custom attribute can be used which indicates an emotion range, indicating what type of emotions should be captured by the target content consumer device and signalled to the content determiner 10.

In a determine that live content is streamed step 42, the content determiner determines that the piece of live content is streamed to the content consumer devices of the reference group. For instance, the content determiner can in some cases stream the piece of live content to the content consumer devices of the reference group. Alternatively, the content determiner can query the content source about this information.

In an obtain emotion indicator(s) step 44, the content determiner obtains, from at least one of the content consumer devices of the reference group, at least one respective emotion indicator associated with a time section of the piece of live content. The time section can be indicated by a start time and an end time or just a start time, i.e. until further notice. In such a case, the emotion indicator could also indicate a default state, where no strong emotions are detected. The emotion indicator can e.g. be received in an additional field of a network statistics message.

In a determine emotion step 46, the content determiner determines an emotion of at least part of the reference users and associates the determined emotion with the time section of the piece of live content.

The emotion determination can e.g. comprise receiving user input data from the reference users in response to a user interface query. The user interface query is then presented to the reference users, asking about an emotional state of the respective reference users.

The determination of emotion based on the user state can be done in the reference content consumer device or in the content determiner. The emotion can be e.g. happiness, excitement, fear, anger, etc., or default as described above.

Optionally, the emotion determination is also based on demographic information (e.g. age and/or sex) of the respective reference user.

In a determine target group step 48, the content determiner determines a target group comprising at least one target content consumer device. Each target content consumer device is associated with a target user.

In one embodiment, the target group is determined based on a parental control preference of the target users which is dependent on time of day. For instance, parental control can be set to be applied until 8 p.m., after which there are no content restrictions until 6 a.m. the next day.

In one embodiment, the target group is determined based on an age indicator of users.

In a trigger content adapting step 50, the content determiner triggers adapting of the piece of live content for at least part of the target content consumer device, resulting in a piece of adapted content, based on the at least one emotion indicator and a preference associated with each respective target content consumer device. The preference can indicate what emotions or types of content that the target user would like to avoid, e.g. to avoid fear, violence and/or nudity. Optionally, demographic data, such as age and/or sex, can also affect the content adapting. The demographic data can be an explicit setting for the target user or it can be obtained from auxiliary systems, such as telecom operator databases or social media.

In one embodiment, the adapting occurs in the target content consumer devices, in which case, the content determiner sends a first signal to at least one of the target content consumer devices to adapt the content.

The adapting can occur by modifying video content of the piece of content. Alternatively or additionally, the adaptation can occur by modifying audio content of the piece of content. Alternatively or additionally, the adaptation can occur by modifying text content (e.g. subtitles) of the piece of content.

In a trigger delay step 52, the content determiner triggers the adapted content to be delayed to achieve at least a minimum latency in relation to the streaming of the piece of live content to the content consumer devices of the reference group.

When the adapting of content occurs in the target content consumer devices, the content determiner sends a second signal to at least one of the target content consumer devices to delay the adapted content.

Looking now to FIG. 4B, only new or modified steps compared to the steps of FIG. 4A will be described.

In an optional stream adapted content step 54, the content determiner streams the adapted content to the target content consumer devices.

Using the methods presented herein, the content consumption is dynamically personalised based on preferences and emotional classification. For example, if the viewer is a child and should not watch a violent scene, then that scene can be identified and replaced for that viewer.

Figure 5:
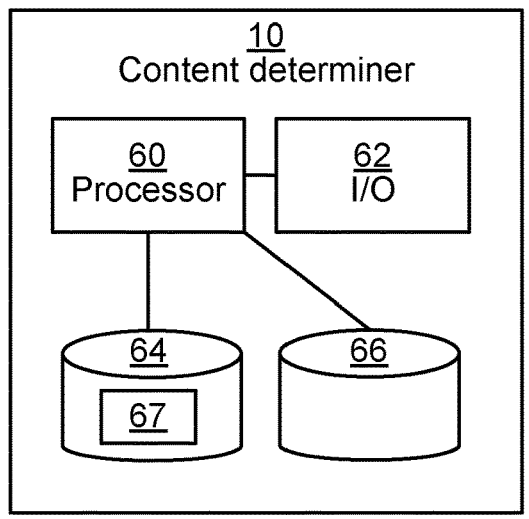
FIG. 5 is a schematic diagram illustrating components of the content determiner of FIGS. 1A-B according to one embodiment.

FIG. 5 is a schematic diagram illustrating components of the content determiner to of FIGS. 1A-B according to one embodiment. A processor 6o is provided using any combination of one or more of a suitable central processing unit (CPU), multiprocessor, microcontroller, digital signal processor (DSP), application specific integrated circuit etc., capable of executing software instructions 67 stored in a memory 64, which can thus be a computer program product. The processor 6o can be configured to execute the method described with reference to FIG. 4A-B above.

The memory 64 can be any combination of random access memory (RAM) and read only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of random access memory (RAM) and read only memory (ROM).

The content determiner 10 further comprises an I/O interface 62 for communicating with other external entities.

Other components of the content determiner 10 are omitted in order not to obscure the concepts presented herein.

Figure 6:
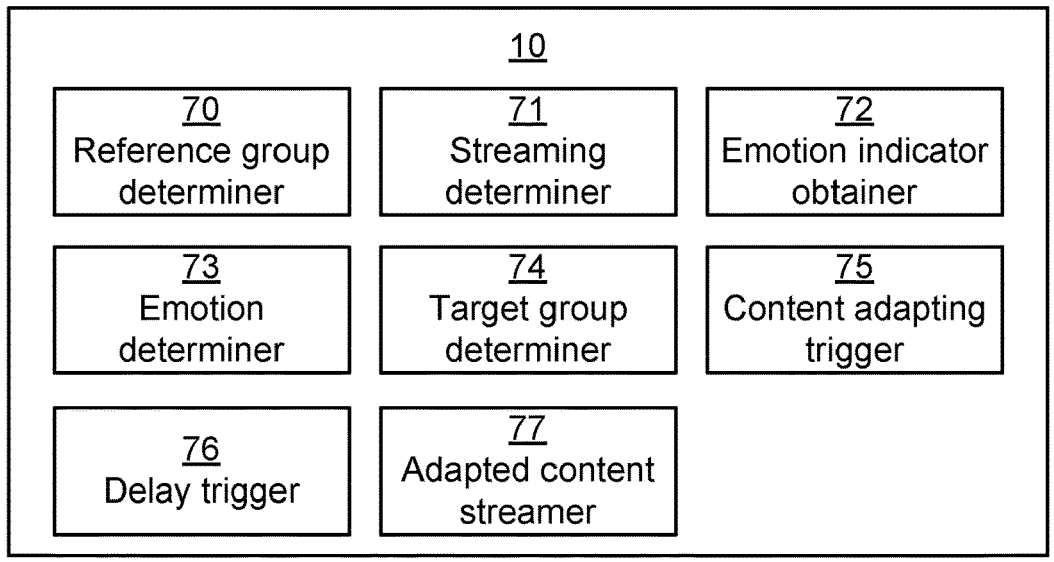
FIG. 6 is a schematic diagram showing functional modules of the content determiner of FIGS. 1A-B according to one embodiment.

FIG. 6 is a schematic diagram showing functional modules of the content determiner of FIGS. 1A-B according to one embodiment. The modules are implemented using software instructions such as a computer program executing in the content determiner. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 4A-B.

A reference group determiner 70 corresponds to step 40. A streaming determiner 71 corresponds to step 42. An emotion indicator obtainer 72 corresponds to step 44. An emotion determiner 73 corresponds to step 46. A target group determiner 73 corresponds to step 48. A content adapting trigger 75 corresponds to step 50. A delay trigger 76 corresponds to step 52. An adapted content streamer 77 corresponds to step 54.

Figure 7:
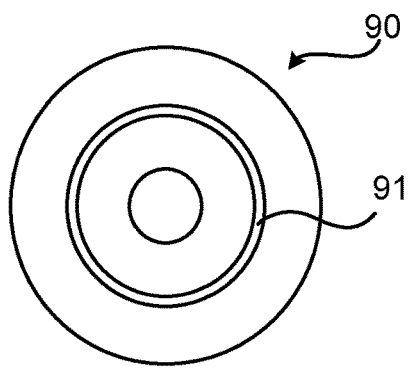
FIG. 7 shows one example of a computer program product comprising computer readable means.

FIG. 7 shows one example of a computer program product comprising computer readable means. On this computer readable means, a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 64 of FIG. 5. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for adapting a piece of live content, the live content comprising at least one of video content and audio content, the method being performed in a content determiner and comprising the steps of:
   determining a reference group comprising at least one reference content consumer device, each reference content consumer device being associated with a reference user and comprising a user state device for detecting a user state for determining an emotion of the reference user;
   determining a target group comprising at least one target content consumer device, each target content consumer device being associated with a target user;
   determining that the piece of live content is streamed to the content consumer devices of the reference group;
   obtaining, from at least one of the content consumer devices of the reference group, at least one respective emotion indicator associated with the piece of live content;
   determining an emotion of at least part of the reference users and associating the determined emotion with the piece of live content;
   triggering adapting of the piece of live content for the at least one target content consumer device, resulting in a piece of adapted content, based on the at least one emotion indicator and a preference associated with the at least one of the target content consumer device;
   streaming the piece of adapted content to the at least one target content consumer device of the target group; and
   controlling delay between the streaming of the piece of live content to the content consumer devices of the reference group and the streaming of the piece of adapted content to the at least one target content consumer device of the target group to provide at least a minimum latency sufficient to enable obtaining the at least one respective emotion indicator from the at least one of the content consumer devices of the reference group.

2. The method according to claim 1, wherein step of determining a reference group is based on a predefined setting indicating approval to become a reference user.

3. The method according to claim 1, wherein the step of determining a target group is based on an age indicator of users.

4. The method according to claim 1, wherein the step of determining a target group is based on a parental control preference of the target users which is dependent on time of day.

5. The method according to claim 1, wherein the step of determining an emotion comprises receiving user input data from the reference users in response to a user interface query, to the reference users, asking about an emotional state of the respective reference users.

6. The method according to claim 1, wherein the step of triggering adapting comprises modifying video content of the piece of content.

7. The method according to claim 1, wherein the step of triggering adapting comprises modifying audio content of the piece of content.

8. The method according to claim 1, wherein the step of triggering adapting comprises modifying text content of the piece of content.

9. The method according to claim 1, wherein the step of determining that the piece of live content is streamed comprises streaming the piece of live content to the content consumer devices of the reference group.

10. The method according to claim 1, further comprising streaming another piece of live content without adaptation to the at least one target content consumer device of the target group responsive to not obtaining an emotion indicator from any of the content consumer devices of the reference group for the other piece of live content within the minimum latency following the streaming of the other piece of live content to the content consumer devices of the reference group.

11. A content determiner for adapting a piece of live content, the live content comprising at least one of video content and audio content, the content determiner comprising:
  a processor; and
  a memory storing instructions that, when executed by the processor, cause the content determiner to:
    determine a reference group comprising at least one reference content consumer device, each reference content consumer device being associated with a reference user and comprising a user state device for detecting a user state for determining an emotion of the reference user;
    determine a target group comprising at least one target content consumer device, each target content consumer device being associated with a target user;
    determine that the piece of live content is streamed to the content consumer devices of the reference group;
    obtain, from at least one of the content consumer devices of the reference group, at least one respective emotion indicator associated with a time section of the piece of live content;
    determine an emotion of at least part of the reference users and associating the determined emotion with the time section of the piece of live content;
    trigger adapting of the piece of live content for the at least one target content consumer device, resulting in a piece of adapted content, based on the at least one emotion indicator and a preference associated with the at least one of the target content consumer device;
    stream the piece of adapted content to the at least one target content consumer device of the target group; and
    control delay between the streaming of the piece of live content to the content consumer devices of the reference group and the streaming of the piece of adapted content to the at least one target content consumer device of the target group to provide at least a minimum latency sufficient to enable obtaining the at least one respective emotion indicator from the at least one of the content consumer devices of the reference group.

12. The content determiner according to claim 11, wherein the instructions to determine a reference group comprise instructions that, when executed by the processor, cause the content determiner to determine the reference group based on a predefined setting indicating approval to become a reference user.

13. The content determiner according to claim 11, wherein the instructions to determine a target group comprise instructions that, when executed by the processor, cause the content determiner to determine the target group is based on an age indicator of users.

14. The content determiner according to claim 11, wherein the instructions to determine a target group comprise instructions that, when executed by the processor, cause the content determiner to determine the target group based on a parental control preference of the target users which is dependent on time of day.

15. The content determiner according to claim 11, wherein the instructions to determine an emotion comprise instructions that, when executed by the processor, cause the content determiner to receive user input data from the reference users in response to a user interface query, to the reference users, asking about an emotional state of the respective reference users.

16. The content determiner according to claim 11, wherein the instructions to trigger adapting comprise instructions that, when executed by the processor, cause the content determiner to modify video content of the piece of content.

17. The content determiner according to claim 11, further comprising streaming another piece of live content without adaptation to the at least one target content consumer device of the target group responsive to not obtaining an emotion indicator from any of the content consumer devices of the reference group for the other piece of live content within the minimum latency following the streaming of the other piece of live content to the content consumer devices of the reference group.

18. A non-transitory computer readable storage medium comprising computer program instructions for adapting a piece of live content, the live content comprising at least one of video content and audio content, wherein the computer program instructions, when run on a content determiner, cause the content determiner to:
  determine a reference group comprising at least one reference content consumer device, each reference content consumer device being associated with a reference user and comprising a user state device for detecting a user state for determining an emotion of the reference user;
  determine a target group comprising at least one target content consumer device, each target content consumer device being associated with a target user;
  determine that the piece of live content is streamed to the content consumer devices of the reference group;
  obtain, from at least one of the content consumer devices of the reference group, at least one respective emotion indicator associated with a time section of the piece of live content;
  determine an emotion of at least part of the reference users and associating the determined emotion with the time section of the piece of live content;
  trigger adapting of the piece of live content for the at least one target content consumer device, resulting in a piece of adapted content, based on the at least one emotion indicator and a preference associated with the at least one of the target content consumer device; and
  stream the piece of adapted content to the at least one target content consumer device of the target group; and control delay between the streaming of the piece of live content to the content consumer devices of the reference group and the streaming of the piece of adapted content to the at least one target content consumer device of the target group to provide at least a minimum latency sufficient to enable obtaining the at least one respective emotion indicator from the at least one of the content consumer devices of the reference group.

19. The non-transitory computer readable storage medium according to claim 18, further comprising streaming another piece of live content without adaptation to the at least one target content consumer device of the target group responsive to not obtaining an emotion indicator from any of the content consumer devices of the reference group for the other piece of live content within the minimum latency following the streaming of the other piece of live content to the content consumer devices of the reference group.

\* \* \* \* \*